(12) United States Patent
Kojima et al.

(10) Patent No.: US 12,289,501 B2
(45) Date of Patent: Apr. 29, 2025

(54) MANAGEMENT SERVER, USER TERMINAL, GIFT SYSTEM, AND INFORMATION PROCESSING METHOD

(71) Applicant: DWANGO Co., Ltd., Tokyo (JP)

(72) Inventors: Takashi Kojima, Tokyo (JP); Kazuomi Niwa, Tokyo (JP)

(73) Assignee: DWANGO CO., LTD. (JP)

( * ) Notice: Subject to any disclaimer, the term of this patent is extended or adjusted under 35 U.S.C. 154(b) by 200 days.

(21) Appl. No.: 17/765,167

(22) PCT Filed: Dec. 14, 2020

(86) PCT No.: PCT/JP2020/046546
§ 371 (c)(1),
(2) Date: Mar. 30, 2022

(87) PCT Pub. No.: WO2021/125131
PCT Pub. Date: Jun. 24, 2021

(65) Prior Publication Data
US 2022/0345782 A1   Oct. 27, 2022

(30) Foreign Application Priority Data

Dec. 19, 2019 (JP) .................................. 2019-229111

(51) Int. Cl.
*H04N 21/4784* (2011.01)
*H04N 21/2187* (2011.01)
(52) U.S. Cl.
CPC ..... *H04N 21/4784* (2013.01); *H04N 21/2187* (2013.01)

(58) Field of Classification Search
CPC ......... H04N 21/2187; H04N 21/41407; H04N 21/2547; H04N 21/6581; H04N 21/4784;
(Continued)

(56) References Cited

U.S. PATENT DOCUMENTS

2020/0077148 A1\* 3/2020 Shirai .................... G06F 3/011
2020/0077157 A1\* 3/2020 Kurabuchi ........... H04N 21/439
2020/0320442 A1\* 10/2020 Miller .................. G06Q 20/384

FOREIGN PATENT DOCUMENTS

CN       105916045 A      8/2016
CN       106168852 A   *  11/2016   .............. G06F 3/011
(Continued)

OTHER PUBLICATIONS

PCT/JP2020/046546 International Search Report dated Mar. 16, 2021, 2 pgs.
CN202080065373.0 Office Action dated May 30, 2023, 13 pgs.

*Primary Examiner* — Ngoc K Vu
(74) *Attorney, Agent, or Firm* — Bracewell LLP; Doug F. Stewart; Patrick J. Connolly

(57) ABSTRACT

A gift system comprising a control server for controlling a gift giving request submitted by a user in a live performance or live broadcast, and a user terminal that is held by the user. The control server comprises: a receiving portion for receiving a gift giving request that is transmitted in response to a user operation; an evaluating portion for evaluating whether to accept the gift giving request based on a target during the performance; and a controlling portion for accepting the gift giving request in exchange for payment depending on the evaluation result by the evaluating portion. The user terminal comprises a detecting portion for detecting a vibration, and a transmitting portion for transmitting a gift giving request when the detecting portion detects the vibration.

11 Claims, 5 Drawing Sheets

(58) Field of Classification Search
CPC ...... H04N 21/478; G06Q 30/02; G06Q 50/10; G06F 13/00
See application file for complete search history.

(56) References Cited

FOREIGN PATENT DOCUMENTS

| | | | |
|---|---|---|---|
| CN | 106488327 | A | 3/2017 |
| CN | 107483986 | A | 12/2017 |
| CN | 108848394 | A | 11/2018 |
| CN | 109104641 | A | 12/2018 |
| CN | 109698964 | A | 4/2019 |
| CN | 109729374 | A | 5/2019 |
| CN | 110124317 | A | 8/2019 |
| CN | 110249631 | A | 9/2019 |
| JP | 2002259880 | A * | 9/2002 |
| JP | 6430059 | B1 | 11/2018 |
| JP | 2018182546 | A | 11/2018 |
| JP | 6491388 | B1 | 3/2019 |
| JP | 6550549 | B1 | 7/2019 |
| WO | 2018121065 | A1 | 7/2018 |
| WO | 2018142494 | A1 | 8/2018 |

\* cited by examiner

[Fig. 1]
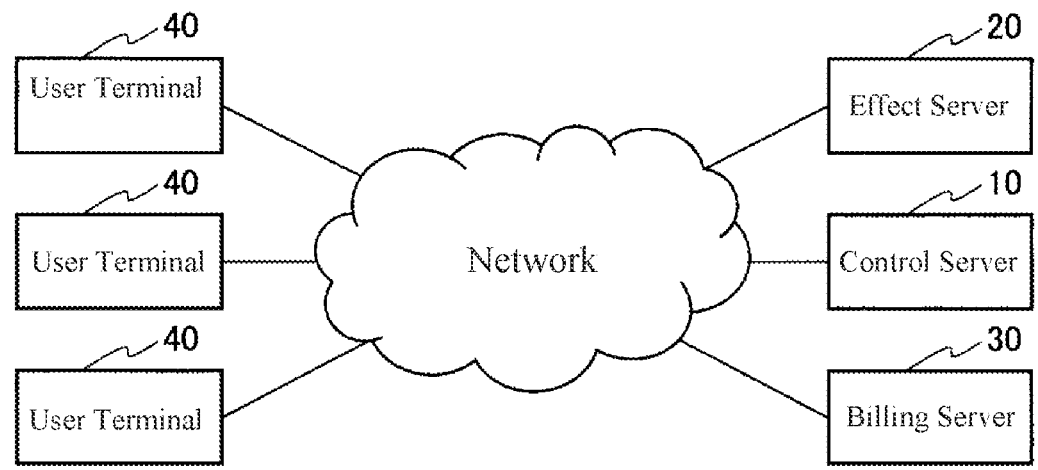
[Fig. 2]
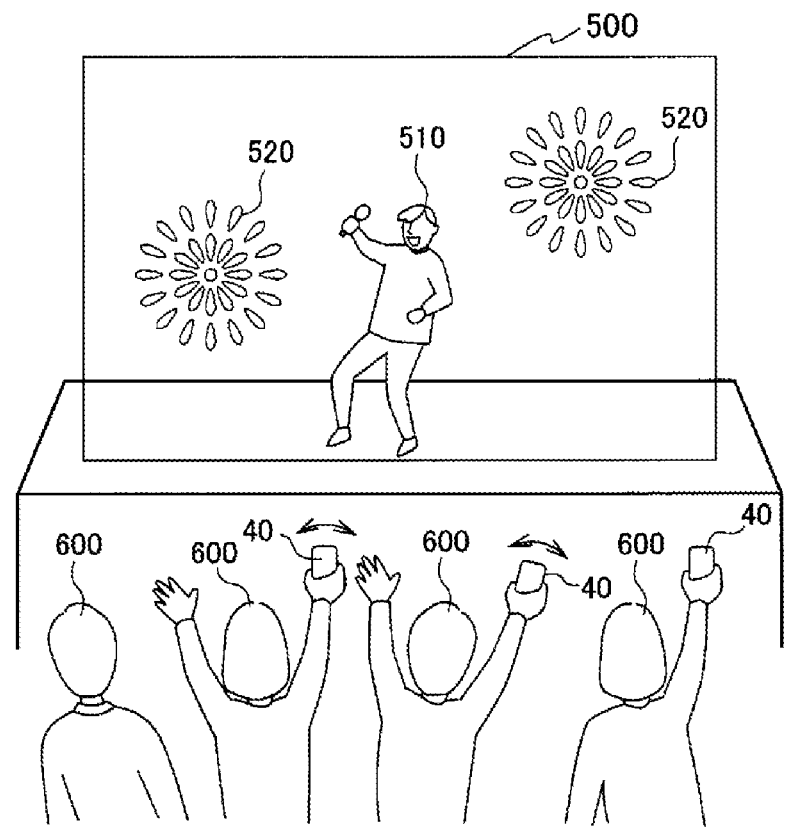

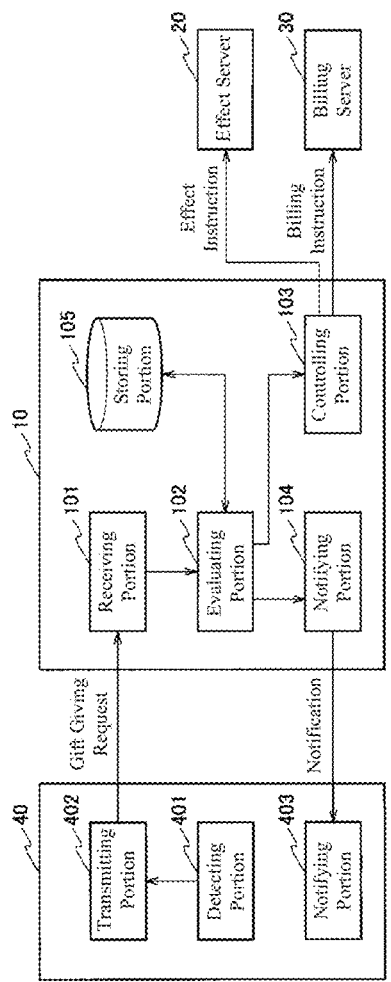
[Fig. 3]

[Fig. 4]
| User ID | Gift Target | | | |
|---|---|---|---|---|
| U0001 | Performer A | Song B | Song C | ... |
| U0002 | Performer D | Performer E | 21:00-21:30 | ... |
| ... | ... | ... | ... | ... |
[Fig. 5]
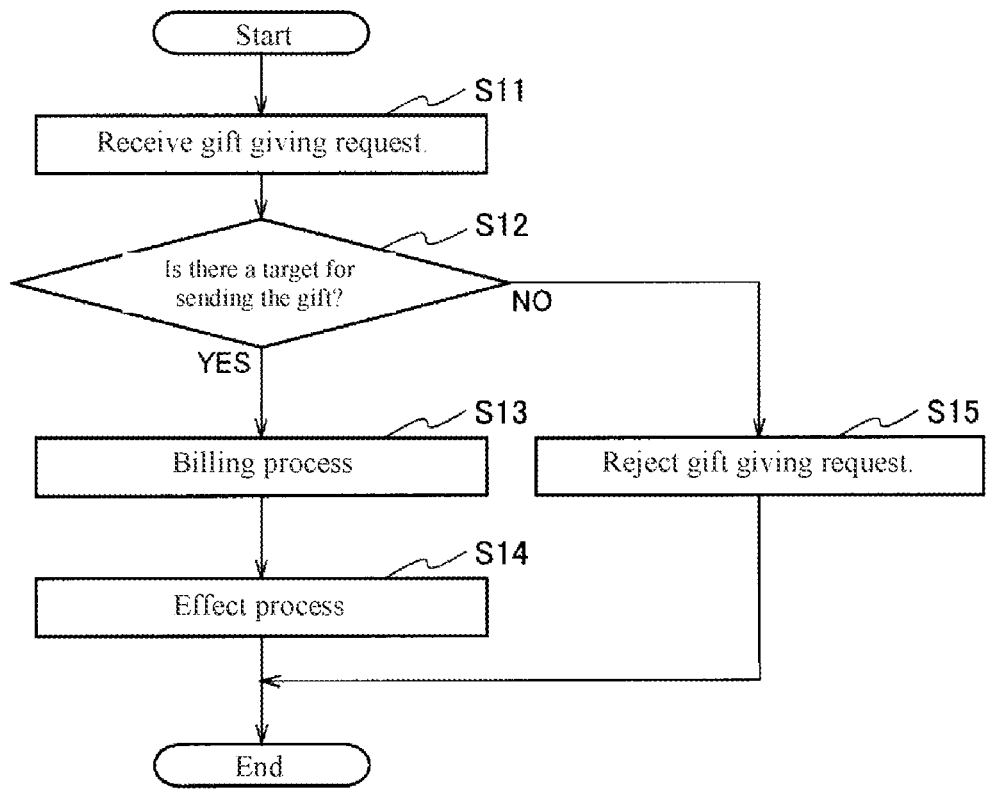

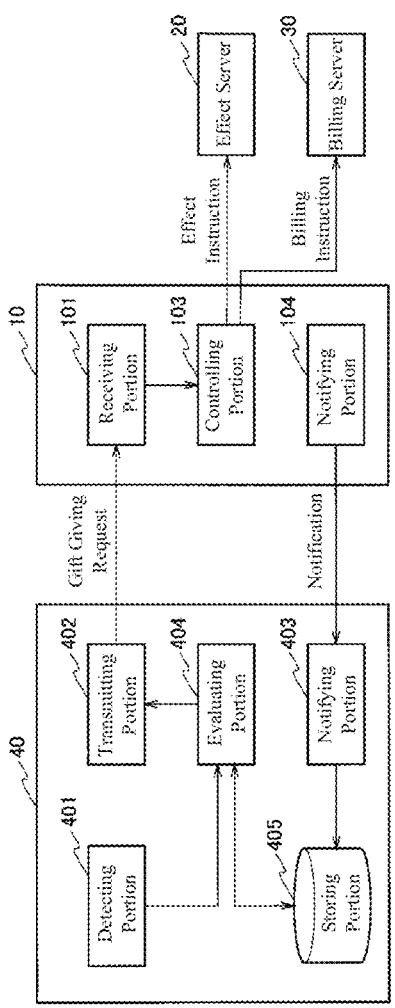
[Fig. 6]

[Fig. 7]
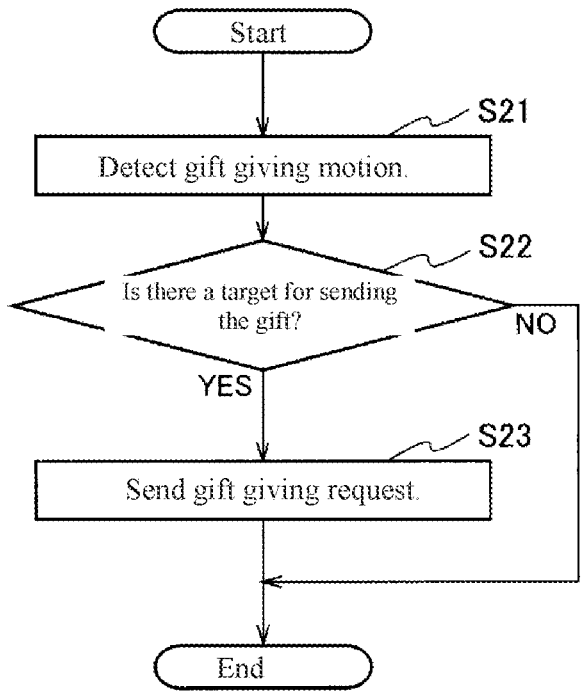

MANAGEMENT SERVER, USER TERMINAL, GIFT SYSTEM, AND INFORMATION PROCESSING METHOD

FIELD OF TECHNOLOGY

The present invention relates to a control server, a user terminal, a gift system, and an information processing method.

PRIOR ART

Services able to distribute videos in the form of live broadcasts using smart phones and personal computers have become popular. There are known services wherein viewers are able to add comments to a video that has been distributed, and able to give gifts (which may be termed "tips," "items," or the like). In Patent Document 1, the user can support contents through performing a "flicking" operation.

Moreover, for a performance in a live performance venue, a spectator within the venue sends gifts electronically from a smart phone held by the spectator.

PRIOR ART DOCUMENTS

Patent Documents

Patent Document 1: Japanese Unexamined Patent Application Publication 2018-182546

SUMMARY OF THE INVENTION

Problem Solved by the Present Invention

In a live performance venue, when sending a gift using a "flicking" operation, as in Patent Document 1, the spectator must perform the operation while looking down to view the terminal. Because of this, the operation for sending the gift does not contribute to adding to excitement.

If, in a live performance venue, the spectator were able to send a gift through a simple cheering action by shaking the smart phone in the direction of the stage, the gift would be given while using the light from the screen of the smart phone to indicate where the spectator is sitting, which is believed to be effective in increasing the level of satisfaction of the spectator and in adding excitement to the event.

However, there has been a problem in that if the smart phone is shaken continuously throughout the entirety of a live event, the payments paid in exchange for the gifts would become excessive. One may also consider a case wherein the spectator, while adding excitement to the event throughout the entirety of a live performance, may wish to send a gift to only a specific performer.

While a system may give the spectator the ability to operate the smart phone to turn the gifting ON and OFF, operating a smart phone during a live performance is troublesome.

The present invention was created in contemplation of the above, and the object thereof is to provide a system that enables a gift to be given to a desired target in an operation that adds excitement to a live performance or live broadcast.

Means for Solving the Problem

A gift system that is one aspect of the present invention is a gift system comprising a control server for controlling a gift giving request submitted by a user in a live performance or a live broadcast and a user terminal held by a user, wherein: the control server comprises: a receiving portion for receiving a gift giving request sent in response to an operation by a user; an evaluating portion for evaluating that the gift giving request is to be accepted if a target in a performance is a gift target that has been set in advance; and a controlling portion for accepting the gift giving request, in exchange for a payment, depending on the evaluation result by the evaluating portion; and the user terminal comprises: a detecting portion for detecting a vibration; and a transmitting portion for transmitting the gift giving request when a vibration has been detected by the detecting portion.

Effects of the Invention

The present invention enables provision of a system that enables a gift to be given to the desired target in an operation that adds excitement to a live performance or live broadcast.

BRIEF DESCRIPTIONS OF THE DRAWINGS

FIG. 1 is a drawing depicting an example configuration of a gift system according to the present embodiment.
FIG. 2 is a diagram depicting an example of a live performance to which the gift system is applied.
FIG. 3 is a diagram depicting an example configuration of a control server and a user terminal.
FIG. 4 is a diagram depicting examples of gift targets that are stored in the control server. FIG. 5 is a flowchart depicting the flow of the process for giving a gift.
FIG. 6 is a diagram depicting an example of a configuration of a control server and a user terminal in a modified example.
FIG. 7 is a flowchart depicting the flow of the process for giving a gift in the modified example.

FORMS FOR CARRYING OUT THE PRESENT INVENTION

System Configuration

Drawings will be used below to explain the present invention.

FIG. 1 is a diagram depicting an example configuration of a gift system according to the present embodiment. The gift system according to the present embodiment is a system for controlling gifts given by a user during a live performance or a live broadcast. The gift system depicted in this figure includes a control server 10, an effect server 20, a billing server 30, and a user terminal 40, These devices are connected through a network.

The control server 10 receives a gift giving request that is transmitted from the user terminal 40, accepts the gift giving request in exchange for payment, and applies, to the live performance venue or live broadcast video, an effect that depends on the gift giving request. The payment may be actual money, or may be points purchased by the user in advance. The user, by giving a gift (which may also be termed a "tip," an "item," or the like), is able to add excitement to the live performance or live broadcast and cheer for the performer or distributor. The revenue through the gift may be distributed as compensation payments to the live performance performer or the live broadcast distributor.

The control server 10 controls, for each user, the target to which the user wishes to give the gift (termed the "gift target"), and accepts a gift giving request only if a target that is currently performing is a gift target. For example, a performer that the user wishes to cheer for, a song that the user likes, or a time band in which the performer that the user wishes to cheer for performs may be set as a gift target. Information such as the performer that is currently performing, the song that is currently being performed, and the like, is inputted by staff members into the control server 10. If the targets in the current performance do not include a gift target of the user that sent a gift giving request, that gift giving request is rejected.

The effect server 20 applies an effect to the live performance or live broadcast video in response to a gift giving request accepted by the control server 10. The effect server 20 may also vary the effect depending on the price of the gift.

For example, in a live performance, the effect server 20 applies an effect to display an image of the gift on a screen that is installed in the live performance venue or to control the lighting within the live performance venue, or applies an effect via sound. Conversely, the effect server 20 may increment a score in response to a gift that has been given, and may apply an effect if the score exceeds a prescribed threshold value. The effect server 20 may apply an effect to the user terminal 40. Fax example, in a live performance venue, a prescribed image may be displayed on the screen of a user terminal 40 that is being shaken by the user.

In a live broadcast, the effect server 20 superimposes an image of the gift, or adds a sound, to the live broadcast video that is being distributed. In the case of a live broadcast program carried out in a three-dimensional virtual space, the effect server 20 may cause a gift object to appear within the virtual space in response to a gift.

The billing server 30 charges the user for payment in response to a gift giving request accepted by the control server 10. For example, the billing server 30 subtracts, from the balance of points purchased in advance by the user, points corresponding to the price, depending on the gift giving request. The billing server 30 notifies the control server 10 that the financial settlement process has been completed, and the control server 10 issues and instruction to the effect server 20 so as to apply an effect in accordance with the gift giving request. If the point balance is insufficient, the billing server 30 notifies the control server 10 that the financial settlement process has failed, and the control server 10 rejects the gift giving request and notifies the user terminal 40 that the financial settlement process failed.

The user terminal 40 is a terminal that is used to add excitement to the live performance and to send gift giving requests. For example, the user is able to launch a prescribed application on a smart phone held by the user, to use the smart phone as the user terminal 40. The user is able to add excitement to the performance by shaking the user terminal 40, which has a screen that is illuminated, in the live performance venue. Additionally, the user is able to operate the user terminal 40 to send a gift giving request to the control server 10. Having the operation of the user terminal 40 be an operation that adds excitement to the live performance and that adds excitement for the user himself/herself makes it possible to give a gift to the gift target While increasing the level of excitement of the live performance. For example, when, in a live performance venue, the user shakes his or her arms, thrusts his or her arms upwards, or jumps up and down while holding the user terminal 40, the user terminal 40 detects the motion of the user to send a gift giving request to the control server 10. That is, when the user, while holding the user terminal 40, carries out an operation to cheer for a performer or to add excitement to the live performance, the user terminal 40 detects this operation and transmits a gift giving request to the control server 10.

When a live broadcast is viewed at home, the user may operate, as the user terminal 40, the device that is being used to view the live broadcast. For example, the user may operate a keyboard of the user terminal 40, or may press a "Give Gift" button that is displayed on the screen, to send a gift to the distributor of the live broadcast. When sending a gift, the user may apply a comment that will be displayed superimposed on the live broadcast video. The user is able to give a gift while adding excitement to the live broadcast by sending a comment. Even when viewing a live broadcast at home, the user may use a smart phone as the user terminal 40, and may send a gift giving request when a prescribed action is performed while holding the user terminal 40.

In any case, the user is able to send a gift giving request while behaving so as to add excitement to the live performance or live broadcast. In the present embodiment, only a gift giving record request for a gift target that has been set in advance will be accepted, making it possible to send a gift to only a desired gift target, while adding excitement to the live performance or live broadcast, without the user having to consciously change behavior depending on whether it is a target which a gift is to be sent or a target to which no gift is to be sent.

FIG. 2 depicts an example of a live performance to which the gift system of the present embodiment is applied. In the example in FIG. 2, a transparent screen 500 is installed on the stage in the live performance venue, and a live event is held by a performer 510 that is rendered through computer graphics (CG). The movements of the performer 510 are controlled in real time by staff in the stage wings or in a separate studio. The singing and exposition by the performer 510 are also performed in real time by the staff.

The spectator (user) 600, from a spectator seat in the live performance venue, cheers for the performer 510 that is displayed on the transparent screen 500. The smart phone held by the spectator 600 is operated as the user terminal 40. When the spectator 600 cheers for the performer 510 by shaking the user terminal 40, the user terminal 40 detects the motion of the spectator 600 and sends a gift giving request.

When a gift is given from the spectator 600, an effect is applied, on the transparent screen 500, in response to the gift. In the example in FIG. 2, an image of fireworks 520 is drawn on the transparent screen 500 in response to the gift being given.

[Device Configuration]

An example of a configuration of the control server 10 and the user terminal 40 will be explained in reference to FIG. 3. The control server 10 depicted in this figure comprises a receiving portion 101, an evaluating portion 102, a controlling portion 103, a notifying portion 104, and a storing portion 105. The user terminal 40 comprises a detecting portion 401, a transmitting portion 402, and a notifying portion 403. The control server 10 and the user terminal 40 may use ordinary computer systems that comprise central calculation processing devices (CPUs), memories, storage, communication functions, and input/output functions. The control server 10 and the user terminal 40 are embodied in these computer systems through the CPU executing prescribed programs that are loaded into memory. The programs may be recorded onto computer-readable recording media such as magnetic disks, optical disks, semiconductor memory, or the like, or may be distributed through a network. The control server 10 may be embodied through a plurality of individual computers, or embodied by a virtual machine in a cloud. The control server 10 may have the functions of the effect server 20 and the billing server 30.

The various portions of the user terminal 40 will be explained first.

The detecting portion 401 uses an acceleration sensor and/or a gyrosensor, or the like, to detect motion of the user terminal 40. When a prescribed motion is detected, the detecting portion 401 evaluates that the user has performed a prescribed action, and instructs the transmitting portion 402 to send a gill giving request. The detecting portion 401 may also detect the prescribed action based on an operation on a touch panel provided at the user terminal 40.

The transmitting portion 402 transmits a gift giving request to the control server 10 based on an instruction from the detecting portion 401. The gift giving request may include a user ID for identifying the user, the type of gift to be given, or information for payment in exchange for the gift. Conversely, the gift giving request may include information on the gift target.

The notifying portion 403 receives an acceptance result for a gift giving request, and sends the gift giving result to the user. For example, when a gift giving request has been accepted, it may vibrate the user terminal 40, illuminate the screen, or cause a sound to be emitted. It may provide notification to the user when a gift giving request has been rejected.

The gift giving request acceptance result may include information on the payment in exchange for the gift, information on the target to which the gift is to be given, or the like. The notifying portion 403 may store the sum of the payments made in exchange, and may send this sum to the user. The notifying portion 403 may calculate sums of payments for individual targets.

Moreover, the notifying portion 403 may provide notification to the user as to whether or not a gift giving request has been accepted. For example, the notifying portion 403 may receive, from the control server 10, information on whether or not the gift can be given, and/or receive information regarding the targets in the current performance, and provide notification to the user as to whether or not the gift can be given. The notifying portion 403 may provide, through detail on the screen or through a sound, information as to whether or not the gift can be given.

The various portions of the control server 10 will be explained next.

The receiving portion 101 receives a gift giving request from the user terminal 40.

The evaluating portion 102 evaluates whether or not the gift giving request that has been received is to be accepted. Specifically, the evaluating portion 102 evaluates whether or not the gift target of the user that sent the gift giving request is included in the current performance, to determine whether or not the gift giving request that has been received is to be accepted. If a target in the current performance is a gift target, it evaluates that the gift giving request can be received, and if no target in the current performance is a gift target, evaluates that the gift giving request is to be rejected.

If the gift giving request is to be accepted, the controlling portion 103 sends, to the billing server 30, a price in accordance with the gift giving request, to charge the user, and causes the effect server 20 to carry out an effect in accordance with the gift giving request.

The notifying portion 104 sends, to the user terminal 40, the gift giving request acceptance result and whether or not the gift can be given.

The storing portion 105 stores the information required in the evaluating process by the evaluating portion 102. For example, as illustrated in FIG. 4, the storing portion 105 stores gift targets for each individual user. In the example in FIG. 4, performers, songs, and time bands are stored as gift targets. The types of gifts and prices thereof may be varied depending on the individual gift target. For example, a low price may be set for "Song B," and a high price may he set for "Song C."

The user may set the gift targets and the prices in advance, or they may be set by the system (sponsor).

If set by the user, the user terminal 40, for example, is used to register favored performers or songs in the control server 10 in advance. The user may reference a live performance schedule to register, in the control server 10, a time hand for giving a gift. The user may also add, remove, or change gift targets during a live performance.

If the gift target is set by the system, the gift targets may be set based on user preferences, such as the ticket purchasing history or program viewing history of the user. The system may set, uniformly for all users, time bands wherein gifts may be received, or set performers or songs for which gifts may be given. The system may set gift targets by individual users instead. For example, the users may be divided into ranks and gift targets to which gifts may be given may be se for only users of high ranks.

[Gift Giving Process]

The processing in the control server 10 will be explained in reference to the flowchart in FIG. 5.

In Step S11, the receiving portion 101 receives a gift giving request from the user terminal 40.

In Step S12, the evaluating portion 102 evaluates whether or not the target in the current performance is a gift target. A specific example of the evaluating process of the evaluating portion 102 is given below.

When a gift giving request is received, the evaluating portion 102 identifies the user that sent the gift giving request, and acquires the gift targets of the user from the storing portion 105. For example, in the case of user U0001 in FIG. 4, the evaluating portion 102 acquires Performer A, Song B, and Song C as gift targets. If the current performance is by Performer A, or if Song B or Song C is being performed, then the evaluating portion 102 evaluates that the gift giving request is to be accepted. If no gift target is included in the current performance, the evaluating portion 102 evaluates that the gift giving request is to be rejected. Note that the evaluating portion 102 is able to acquire information regarding the performer and song of the current performance. For example, staff members make input, into the control server 10, information for the performer and song of the current performance, or the performance sequence and times may be inputted into the control server 10 in advance.

If the gift giving request includes a gift target, the evaluating portion 102 may compare the targets in the current performance to the gift target included in the gift giving request.

When a gift giving request is received, then, in Step S13, the controlling portion 103 issues, to the billing server 30, an instruction to charge a price depending on the gift giving request, and in Step S14 issues, to the effect server 20, an instruction for an effect in response to the gift giving request.

If the gift giving request includes information on the type or price of the gift, the controlling portion 103 may issue, to the billing server 30, an instruction in accordance with the type or price of the gift included in the gift giving request.

When a gift giving request is rejected, then, in Step S15, the notifying portion 104 provides notification to the user terminal 40 that the gift giving request has been rejected. Note that if the gift giving request has been accepted, the notifying portion 104 may provide notification to the user terminal 40 that the gift giving request has been accepted.

MODIFIED EXAMPLE

A gift system according to modified example will be explained below. In the gift system according to the modified example, the user terminal 40 evaluates whether or not to send a gift giving request.

An example configuration for the control server 10 and the user terminal 40 of the modified example will be explained in reference to FIG. 6, The control server 10 depicted in this figure comprises a receiving portion 101, a controlling portion 103, and a notifying portion 104. The user terminal 40 comprises a detecting portion 401, a transmitting portion 402, a notifying portion 403, an evaluating portion 404, and a storing portion 405. The control server 10 and the user terminal 40 of FIG. 6 may have the various portions with the same functions as depicted in FIG. 3.

The various portions of the user terminal 40 will be explained first.

The detecting portion 401 detects motion of the user terminal 40 using an acceleration sensor and/or a gyrosensor, or the like. The detecting portion 401 notifies the evaluating portion 404 that a prescribed motion has been detected.

The evaluating portion 404 evaluates whether or not to send the gift giving request. Specifically, the evaluating portion 404 evaluates whether or not a gift target is included in the targets in the current performance, to determine whether or not to send the gift giving request. Information regarding the current performance may be queried from the control server 10, or information received from the control server 10 may be stored in advance in the storing portion 405. The gift targets are stored in advance in the storing portion 405.

The transmitting portion 402 transmits the gift giving request to the control server 10 based on the evaluation result by the evaluating portion 404.

The storing portion 405 stores the information that is required in the evaluating process by the evaluating portion 404. For example, the gift targets, as depicted in FIG. 4, are stored.

The notifying portion 403 receives the gift giving result, and sends the gift giving results to the user.

Additionally, the notifying portion 403 receives, from the control server 10, information for targets in the current performance, and stores it in the storing portion 405. If there is a gift target in the targets in the performance, received from the control server 10, the notifying portion 403 notifies the user that it is possible to give a gift.

The various portions of the control server 10 in the modified example will be explained next.

The receiving portion 101 receives a gift giving request from the user terminal 40.

The controlling portion 103 sends, to the billing server 30, a price depending on the gift giving request, to charge the user, and causes the effect server 20 to execute an effect in accordance with the gift giving request.

The notifying portion 104 sends the gift giving result to the user terminal 40, and sends, to the user terminal 40, information regarding the targets in the current performance.

The processing in the user terminal 40 of the modified example will be explained in reference to the flow chart in FIG. 7.

In Step S21, the detecting portion 401 detects, from the motion of the user terminal 40, that the user has carried out a prescribed action.

In Step S22, the evaluating portion 404 evaluates whether or not the targets in the current performance are gift targets.

If the evaluating portion 404 has evaluated that there is a gift target, then, in Step S23, the transmitting portion 402 transmits the gift giving request to the control server 10.

The process is terminated if the evaluating portion 404 evaluates that there is no gift target. Even though an action for giving a gift has been detected, the notifying portion 403 provides notification to the user that no gift giving request has been sent because there is no gift target.

OTHER MODIFIED EXAMPLES

The cumulative cost not exceeding an upper limit value may be applied as a condition for the control server 10 of FIG. 3 to accept a gift giving request, or as a condition for the user terminal 40 of FIG. 6 to send a gift giving request. For example, the control server 10 may calculate, for each individual user, the sum of payments made by the user, and, regardless of whether or not is a gift target in the targets in the current performance, may reject a gift giving request from a user after the sum of the payments has reached an upper limit value. This makes it possible to anticipate that the user will continue to participate in the live performance or view the live broadcast, while keeping the user from spending too much money.

The upper limit value may be set by individual user, or maybe set for each live performance, that is, set for all users. If the upper limit value is set for all users, then once the total sum of payments paid in the live performance reaches the upper limit value, gift giving request thereafter will be rejected.

The upper limit value may be set for different time intervals, or may be set for individual targets. For example, upper limit values may be set for individual time bands such as for up to one hour after the beginning of the live performance, for one hour to two hours after the beginning of the live performance, and from two hours until the end. When the sum of the payments for the given time band has reached the upper limit value, the gift giving request will be rejected. When the next time band is entered, the sum is reset so that a gift giving request will be accepted. A similar process is possible when an upper limit value is set for each individual target, The upper limit value conditions described above may be combined together. For example, an upper limit value for each individual user and an upper limit value for all users may be set, where if the sum reaches either upper limit value a gift giving request will be rejected.

As explained above, the gift system according to the present embodiment comprises a control server 10 for controlling a gift giving request for a user giving a gift in a live performance or live broadcast, and a user terminal 40 that is held by the user. The control server 10 comprises a receiving portion 101 for receiving a gift giving request that is sent in response to an operation by the user, an evaluating portion 102 for evaluating whether or not a gift giving request is to be accepted, based on targets in a performance, and a controlling portion 103 for accepting a gift giving request, in exchange for a payment, depending on the evaluation result by the evaluating portion 102. The user terminal 40 comprises a detecting portion 401 for detecting a vibration and a transmitting portion 402 for transmitting a gift giving request when the detecting portion 401 has detected the vibration. Through this, the user is able to give a gift to only a gift target that is intended by the user while increasing the excitement of the live performance, through an operation wherein the user terminal 40 is shaken in the direction of the stage. Because this can suppress the money that is used in the live performance, this can reduce the monetary burden on the user, making it possible to ensure continuity of participation.

EXPLANATIONS OF REFERENCE SYMBOLS

10: Control Server
101: Receiving Portion
102: Evaluating Portion
103: Controlling Portion
104: Notifying Portion
105: Storing Portion
20: Effect Server
30: Billing Server
40: User Terminal
401: Detecting Portion
402: Transmitting Portion
403: Notifying Portion
404: Evaluating Portion
405: Storing Portion

The invention claimed is:

1. A control server configured to control a gift giving request submitted by a user in a live performance or a live broadcast, comprising:
a receiving portion configured to receive a gift giving request sent in response to an operation by the user;
an evaluating portion configured to provide an evaluation result indicating whether the gift giving request is to be accepted if a target in a performance is a gift target that has been set in advance, and to provide an evaluation result indicating that the gift giving request is to be rejected if the target in the performance is not the gift target that has been set in advance;
a notifying portion configured to provide notification of a state wherein the gift giving request can be given; and
a controlling portion configured to accept the gift giving request, in exchange for a payment, depending on the evaluation result,
wherein the evaluating portion is further configured to determine an identity of the user that submitted the gift giving request,
wherein the identity is used to acquire the gift target, and
wherein the controlling portion is further configured to calculate an upper limit value for a total sum of gift giving requests made by the user and reject any gift giving request that exceeds the upper limit value.

2. The control server of claim 1, wherein:
the gift target is set by an individual user.

3. The control server of claim 1, wherein:
the evaluating portion is configured to evaluate whether the gift giving request is to be accepted if the gift giving request is received during a time band that is set in advance.

4. The control server of claim 1, comprising:
an effect portion configured to apply a prescribed effect to the live performance or the live broadcast when the gift giving request has been accepted.

5. A user terminal configured to transmit a gift giving request to a control server configured to accept the gift giving request when a target in a performance is a gift target that has been set in advance, comprising:
a detecting portion configured to detect a vibration;
a transmitting portion configured to transmit the gift giving request when the vibration has been detected by the detecting portion; and
a notifying portion configured to provide notification of a state wherein the gift giving request can be given,
wherein the control server further comprises:
an evaluating portion configured to:
provide an evaluation result indicating whether the gift giving request is to be accepted if the target in a performance is the gift target that has been set in advance and provide an evaluation result indicating that the gift giving request is to be rejected if the target in the performance is not the gift target that has been set in advance; and
determine an identity of a user that submitted the gift giving request
wherein the identity is used to acquire the gift target, and
wherein the controlling portion is further configured to calculate an upper limit value for a total sum of gift giving requests made by the user and reject any gift giving request that exceeds the upper limit value.

6. A gift system comprising a control server configured to control a gift giving request submitted by a user in a live performance or a live broadcast and a user terminal held by the user, wherein:
the control server comprises:
a receiving portion configured to receive the gift giving request sent in response to an operation by the user;
an evaluating portion configured to provide an evaluation result indicating whether the gift giving request is to be accepted if a target in a performance is a gift target that has been set in advance and provide an evaluation result indicating that the gift giving request is to be rejected if the target in the performance is not the gift target that has been set in advance; and
a notifying portion configured to provide notification of a state wherein the gift giving request can be given;
a controlling portion configured to accept the gift giving request, in exchange for a payment, depending on the evaluation result by the evaluating portion; and
the user terminal comprises:
a detecting portion configured to detect a vibration;
a transmitting portion configured to transmit the gift giving request when the vibration has been detected by the detecting portion
wherein the evaluating portion is further configured to determine an identity of the user that submitted the gift giving request,
wherein the identity is used to acquire the gift target,
wherein the controlling portion is further configured to calculate an upper limit value for a total sum of gift giving requests made by the user and reject any gift giving request that exceeds the upper limit value.

7. An information processing method executed by a control server for controlling a gift giving request submitted by a user in a live performance or a live broadcast, including:
receiving the gift giving request sent in response to an operation by the user;
evaluating whether the gift giving request is to be accepted if a target in a performance is a gift target that is set in advance;
providing an evaluation result that indicates whether the gift giving request is to be accepted and providing an evaluation result indicating that the gift giving request is to be rejected if the target in the performance is not the gift target that has been set in advance;

receiving the gift giving request in exchange for a payment depending on the evaluation result;

determining an identify of the user that submitted the gift giving request;

calculating an upper limit value for a total sum of gift giving requests made by the user;

rejecting any gift giving request that exceeds the upper limit value; and notifying the user whether the gift giving request can be given.

8. The control server of claim 1, wherein, for each live performance or live broadcast, the upper limit is calculated both for each individual user and for all users collectively.

9. The user terminal of claim 5, wherein, for each performance, the upper limit is calculated both for each individual user and for all users collectively.

10. The gift system of claim 6, wherein, for each live performance or live broadcast, the upper limit is calculated both for each individual user and for all users collectively.

11. The information processing method of claim 7, wherein, for each live performance or live broadcast, the upper limit is calculated both for each individual user and for all users collectively.

* * * * *